(12) United States Patent
Bozell et al.

(10) Patent No.: US 9,382,282 B2
(45) Date of Patent: Jul. 5, 2016

(54) METAL CATALYZED OXIDATION OF LIGNIN AND RELATED COMPOUNDS

(75) Inventors: Joseph J. Bozell, Knoxville, TN (US); Sabornie Chatterjee, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 110 days.

(21) Appl. No.: 14/343,980

(22) PCT Filed: Sep. 10, 2012

(86) PCT No.: PCT/US2012/054419
§ 371 (c)(1),
(2), (4) Date: May 21, 2014

(87) PCT Pub. No.: WO2013/036911
PCT Pub. Date: Mar. 14, 2013

(65) Prior Publication Data
US 2014/0249300 A1 Sep. 4, 2014

Related U.S. Application Data

(60) Provisional application No. 61/532,824, filed on Sep. 9, 2011.

(51) Int. Cl.
*C07G 1/00* (2011.01)
*C08H 7/00* (2011.01)
*C08L 97/00* (2006.01)

(52) U.S. Cl.
CPC .. *C07G 1/00* (2013.01); *C08H 6/00* (2013.01); *C08L 97/005* (2013.01)

(58) Field of Classification Search
CPC .................................. C07G 1/00; C08H 6/00
See application file for complete search history.

(56) References Cited

U.S. PATENT DOCUMENTS

| | | | | | |
|---|---|---|---|---|---|
| 2,431,419 | A | * | 11/1947 | Pearl | 562/475 |
| 3,910,873 | A | * | 10/1975 | Lin | 530/500 |
| 3,939,286 | A | * | 2/1976 | Jelks | 426/312 |
| 4,141,786 | A | * | 2/1979 | Eckert | 162/40 |
| 4,773,966 | A | * | 9/1988 | Huynh | 162/78 |
| 5,002,634 | A | * | 3/1991 | Dimmel et al. | 162/72 |
| 5,074,960 | A | * | 12/1991 | Nimz et al. | 162/65 |
| 5,169,931 | A | * | 12/1992 | Sears et al. | 530/500 |
| 5,446,133 | A | * | 8/1995 | Detroit | 530/500 |
| 6,214,976 | B1 | * | 4/2001 | Watanabe et al. | 530/500 |
| 6,770,168 | B1 | * | 8/2004 | Stigsson | 162/24 |
| 7,906,687 | B2 | | 3/2011 | Voitl et al. | |
| 2005/0014002 | A1 | * | 1/2005 | Varadaraj | 428/403 |
| 2010/0159515 | A1 | * | 6/2010 | Cirakovic | 435/72 |
| 2012/0012035 | A1 | * | 1/2012 | Blank et al. | 106/802 |
| 2012/0107886 | A1 | * | 5/2012 | Albizati et al. | 435/146 |
| 2012/0322990 | A1 | * | 12/2012 | Passauer et al. | 530/502 |
| 2014/0135470 | A1 | * | 5/2014 | Murray et al. | 528/308.3 |
| 2014/0235838 | A1 | * | 8/2014 | Stahl et al. | 530/504 |

OTHER PUBLICATIONS

Stark et al. (ChemSusChem, 2010, 3, 719-723).*
Ji et al. (React. Kinet. Catal. Lett. vol. 78, No. 1, 73-80, 2003).*
International Search Report and Written Opinion, Dec. 17, 2012, for PCT/US12/54419, 8 pgs.
Haikarainen, A., "Salen Complexes with Bulky Substituents as Useful Tools for Biomimetic Phenol Oxidation Research," Bioorganic & Medicinal Chemistry 9, 2001, pp. 1633-1638.
Haikarainen, A., "Metalsalen Catalysts in the Oxidation of Lignin Model Compounds," Jun. 2005, retrieved from http://ethesis.helsinki.fi/julkaisut/mat/kemia/vk/haikarainen/metalsal.pdf, 120 pgs.

* cited by examiner

*Primary Examiner* — Liam J Heincer
(74) *Attorney, Agent, or Firm* — Jenkins, Wilson, Taylor & Hunt, P.A.

(57) ABSTRACT

Disclosed are methods for the benzylic oxidation of the lignin and related compounds. The methods include contacting lignin with a mixture containing manganese and iron, in the presence of oxygen to produce a carboxylic acid from lignin or a related compound. In some embodiments, the mixture includes cobalt.

18 Claims, 7 Drawing Sheets

FIG. 4A

| Typical signal location ($^{13}C/^1H$) | assignment |
|---|---|
| Carbonyl | region |
| 190.81/9.86 | aldehydic C/H |
| 189.84/9.86 | aldehydic C/H (new peak) |
| Aromatic | region |
| 142.67/7.63 | $C_\beta/H_\beta$ in conjugated esters (new peak) |
| 142.65/7.69 | $C_\beta/H_\beta$ in conjugated esters (new peak) |
| 137.48/8.11 | $C_\beta/H_\beta$ in ferulates (new peak) |
| 137.41/8.16 | $C_\beta/H_\beta$ in ferulates (new peak) |
| 134.89/8.02 | $C_{2,6}/H_{2,6}$ in quinones (new peak) |
| 134.88/7.99 | $C_{2,6}/H_{2,6}$ in quinones (new peak) |
| 131.74/7.77 | $C_{2,6}/H_{2,6}$ in P units with α-carbonyl (new peak) |
| 131.57/7.69 | $C_{2,6}/H_{2,6}$ in P units with α-carbonyl (new peak) |
| 130.07/7.54 | $C_{2,6}/H_{2,6}$ in P units |
| 128.46/7.72 | $C_{2,6}/H_{2,6}$ in P units (new peak) |
| 125.85/7.42 | $C_6/H_6$ in G units with α,β unsaturated carbonyl (new peak) |
| 125.85/7.40 | $C_6/H_6$ in G units with α,β unsaturated carbonyl (new peak) |
| 119.85/7.25 | $C_6/H_6$ in G units |
| 119.83/7.22 | $C_6/H_6$ in G units |
| 119.43/7.15 | $C_6/H_6$ in G units |
| 115.58/6.91 | G $C_5/H_5$, P $C_{3,5}/H_{3,5}$ |
| 115.55/6.94 | G $C_5/H_5$, P $C_{3,5}/H_{3,5}$ |
| 115.09/6.97 | G $C_5/H_5$, P $C_{3,5}/H_{3,5}$ |
| 112.53/6.80 | $C_6/H_6$ in G units with α,β unsaturated carbonyl (new peak) |
| 110.74/6.89 | $C_2/H_2$ in esterified ferulates or free ferulic acids |
| 110.41/7.47 | $C_2/H_2$ in esterified ferulates or free ferulic acids |
| 110.37/7.38 | $C_2/H_2$ in esterified ferulates or free ferulic acids |
| 107.40/7.20 | $C_2/H_2$ in quinones (new peak) |
| 107.29/4.91 | Alkyl glycoside anomeric peak |
| 106.80/7.20 | S $C_{2,6}/H_{2,6}$ in with carbonyl at α position of side chain |
| 106.79/5.96 | Alkyl glycoside anomeric peak |
| 106.08/7.32 | S $C_{2,6}/H_{2,6}$ in with carbonyl at α position of side chain (new peak) |
| 104.63/4.91 | S $C_{2,6}/H_{2,6}$ in with carbonyl at α position of side chain (new peak) |
| 104.59/4.88 | S $C_{2,6}/H_{2,6}$ with α,β unsaturation (new peak) |
| 104.39/5.05 | S $C_{2,6}/H_{2,6}$ with α,β unsaturation (new peak) |
| Side chain | region |
| 100.78/4.85 | Anomeric postion in furanose ring (new peak) |
| 99.02/5.16 | Anomeric postion in furanose ring (new peak) |
| 98.53/5.05 | Anomeric postion in furanose ring (new peak) |
| 83.71/4.83 | $C_\beta/H_\beta$ in β-O-4 |
| 80.74/4.93 | Furanose -OH |

FIG. 4B

| | |
|---|---|
| 80.69/4.91 | Furanose -OH |
| 79.45/4.25 | Lignin carbohydrate linkages |
| 79.38/4.16 | Lignin carbohydrate linkages |
| 79.17/4.75 | Lignin carbohydrate linkages |
| 78.77/3.96 | Lignin carbohydrate linkages (new peak) |
| 76.51/4.91 | Lignin carbohydrate linkages |
| 75.89/5.02 | Unidentified (new peak) |
| 70.85/4.00 | Pyranose-OH |
| 68.56/5.16 | $C_\gamma$/$H\gamma$ with esterified γ-OH and α,β unsaturation (new peak) |
| 67.12/4.13 | $C_\gamma$/$H\gamma$ with esterified γ-OH and α,β unsaturation (new peak) |
| 64.42/4.08 | $C_\gamma$/$H\gamma$ with esterified γ-OH and α,β unsaturation (new peak) |
| 62.96/4.28 | $C_\gamma$/$H\gamma$ with esterified γ-OH |
| 62.82/4.25 | $C_\gamma$/$H\gamma$ with esterified γ-OH |
| 62.56/4.31 | Aryl glycerol |
| 62.50/4.35 | Aryl glycerol |
| 62.09/3.65 | $C_\gamma$/$H\gamma$ in phenylcoumaran |
| 62.08/3.47 | Various $C_\gamma$/$H\gamma$ in side chains |
| 59.31/4.03 | Various $C_\gamma$/$H\gamma$ in side chains (new peak) |
| 57.16/5.14 | Methoxy (new peak) |
| 56.16/3.75 | Methoxy |
| 56.00/3.92 | Methoxy |
| 55.56/3.84 | Methoxy |
| Alkyl | region |
| 45.40/3.10 | $C_\beta$/$H_\beta$ in side chains (new peak) |
| 45.46/3.08 | $C_\beta$/$H_\beta$ in side chains (new peak) |
| 33.17/2.25 | Benzylic $CH_2$ |
| 33.34/2.16 | Benzylic $CH_2$ |
| 33.36/2.18 | Benzylic $CH_2$ |
| 30.99/1.23 | Alkyl groups α to a carbonyl and/or solvent |
| 28.65/1.22 | CH signals in extractives and aliphatic lignin chains |
| 26.28/2.54 | CH signals in extractives and aliphatic lignin chains |
| 26.16/2.47 | CH signals in extractives and aliphatic lignin chains |
| 24.14/1.48 | CH signals in extractives and aliphatic lignin chains |
| 21.83/1.23 | CH signals in extractives and aliphatic lignin chains (new peak) |
| 22.19/0.83 | Solvent |
| 19.28/0.82 | High field alkyls (new peak) |
| 18.57/0.94 | High field alkyls (new peak) |
| 18.54/1.12 | High field alkyls (new peak) |
| 15.28/0.83 | High field alkyls |
| 14.66/1.13 | High field alkyls |
| 13.80/1.19 | High field alkyls |
| 13.61/0.85 | High field alkyls |
| 11.43/0.63 | High field alkyls |

FIG. 5-1

| Typical signal location ($^{13}C/^1H$) | assignment |
|---|---|
| Carbonyl | region |
| 190.75/9.78 | Aldehydic C/H |
| 177.60/9.54 | Unidentified (absent in the product's HMQC) |
| Aromatic | region |
| 144.96/7.60 | $C_\alpha / H_\alpha$ in conjugated ester (absent in the product's HMQC) |
| 144.88/7.55 | $C_\alpha / H_\alpha$ in conjugated ester (absent in the product's HMQC) |
| 129.89/7.56 | $C_{2,6} / H_{2,6}$ in P units |
| 129.82/7.42 | $C_{2,6} / H_{2,6}$ in P units |
| 127.99/7.87 | $C_{2,6} / H_{2,6}$ in P units with α-OH or OR (absent in the product's HMQC) |
| 127.60/7.35 | $C_{2,6} / H_{2,6}$ in P units with α-OH or OR (absent in the product's HMQC) |
| 122.87/7.16 | F $C_6/H_6$ (absent in the product's HMQC) |
| 119.89/6.74 | $C_6 / H_6$ in G units |
| 119.80/5.25 | unidentified |
| 115.28/6.79 | G $C_5/H_5$, P $C_{3,5}/H_{3,5}$ |
| 114.91/6.96 | $C_\beta/H_\beta$ in ferulates (absent in the product's HMQC) |
| 110.76/7.34 | $C_2/H_2$ in esterified ferulates or free ferulic acids |
| 110.27/7.39 | $C_2/H_2$ in esterified ferulates or free ferulic acids |
| 109.96/6.89 | 4-O-5 (absent in the product's HMQC) |
| 107.91/4.77 | Alkyl glycoside anomeric peak |
| 106.64/7.21 | S $C_{2,6}/H_{2,6}$ in with carbonyl at α position of side chain |
| 103.28/6.99 | $S_{2,6}/H_{2,6}$ (absent in the product's HMQC) |
| 103.85/7.33 | $S_{2,6}/H_{2,6}$ (absent in the product's HMQC) |
| 103.27/6.62 | $S_{2,6}/H_{2,6}$ (absent in the product's HMQC) |
| Side chain | region |
| 101.02/4.77 | Anomeric position in furanose ring |
| 98.54/6.22 | Anomeric position in furanose ring |
| 93.92/6.54 | Unidentified (absent in the product's HMQC) |
| 83.01/4.29 | Furanose -OH |
| 81.55/3.82 | Furanose -OH |
| 79.62/4.45 | Lignin carbohydrate linkages |
| 63.41/3.32 | $C_\gamma /H_\gamma$ with esterified γ-OH |
| 62.20/3.63 | $C_\gamma /H_\gamma$ in phenylcoumaran |
| 59.53/3.58 | $C_\gamma /H_\gamma$ in β-O-4 |
| 59.27/4.02 | $C_\gamma /H_\gamma$ in P units |
| 55.54/4.47 | unidentified |
| 55.27/3.74 | Methoxy |
| Alkyl | region |
| 51.42/2.29 | Solvent |
| 45.35/3.08 | Unidentified |
| 33.13/2.18 | Benzylic $CH_2$ |
| 30.88/1.23 | Alkyl groups α to a carbonyl and/or solvent |
| 29.63/2.05 | Alkyl groups α to a carbonyl and/or solvent |

FIG. 5-2

| | |
|---|---|
| 28.35/1.23 | CH signals in extractives and aliphatic lignin chains |
| 26.21/2.54 | CH signals in extractives and aliphatic lignin chains |
| 24.04/1.49 | CH signals in extractives and aliphatic lignin chains |
| 21.91/0.83 | CH signals in extractives and aliphatic lignin chains |
| 21.67/1.23 | CH signals in extractives and aliphatic lignin chains |
| 19.24/0.82 | unidentified |
| 18.69/0.94 | unidentified |
| 14.75/1.07 | High field alkyls |
| 13.69/1.17 | High field alkyls |
| 11.25/0.65 | High field alkyls |

FIG. 6

| Typical signal location ($^{13}C/^1H$) | assignment |
|---|---|
| Carbonyl | region |
| 190.76/9.75 | Aldehydic C/H |
| Aromatic | region |
| 145.06/7.56 | $C_\alpha/H_\alpha$ in conjugated ester |
| 145.03/7.63 | $C_\alpha/H_\alpha$ in conjugated ester |
| 144.98/7.48 | $C_\alpha/H_\alpha$ in conjugated ester |
| 130.01/7.51 | $C_{2,6}/H_{2,6}$ in P units |
| 129.82/7.51 | $C_{2,6}/H_{2,6}$ in P units |
| 129.71/7.51 | $C_{2,6}/H_{2,6}$ in P units with α-OH or OR |
| 125.75/7.39 | $C_{2,6}/H_{2,6}$ in P units with α-OH or OR |
| 119.59/6.78 | $C_6/H_6$ in G units |
| 115.43/6.79 | G $C_5/H_5$, P $C_{3,5}/H_{3,5}$ |
| 114.89/6.32 | $C_\beta/H_\beta$ in ferulates |
| 111.11/6.96 | $C_2/H_2$ in esterified ferulates or free ferulic acids |
| 110.83/7.32 | $C_2/H_2$ in esterified ferulates or free ferulic acids |
| 110.27/7.38 | $C_2/H_2$ in esterified ferulates or free ferulic acids |
| 103.72/6.68 | $S_{2,6}/H_{2,6}$ |
| Side chain | region |
| 82.64/4.99 | Furanose -OH |
| 80.69/4.95 | Furanose -OH |
| 78.01/4.83 | Lignin carbohydrate linkages |
| 73.05/5.87 | Lignin carbohydrate linkages |
| 61.88/4.24 | $C_\gamma/H_\gamma$ in phenylcoumaran |
| 60.22/4.53 | $C_\gamma/H_\gamma$ in β-O-4 |
| 55.33/3.76 | Methoxy |
| Alkyl | region |
| 39.24/2.50 | Unidentified |
| 30.31/1.17 | Alkyl groups α to a carbonyl and/or solvent |
| 30.28/1.95 | Alkyl groups α to a carbonyl and/or solvent |
| 30.20/2.32 | Alkyl groups α to a carbonyl and/or solvent |
| 30.22/2.51 | Alkyl groups α to a carbonyl and/or solvent |
| 22.55/0.79 | CH signals in extractives and aliphatic lignin chains |
| 20.56/1.91 | CH signals in extractives and aliphatic lignin chains |
| 14.64/1.11 | High field alkyls |
| 13.64/1.16 | High field alkyls |

…

METAL CATALYZED OXIDATION OF LIGNIN AND RELATED COMPOUNDS

CROSS-REFERENCE TO RELATED APPLICATION

This is the U.S. National Stage of International Application No. PCT/US2012/54419, filed Sep. 10, 2012, which was published in English under PCT Article 21(2), which in turn claims the priority benefit of the earlier filing date of U.S. Provisional Application No. 61/532,824, filed Sep. 9, 2011, which is incorporated herein by reference in its entirety.

FIELD OF THE DISCLOSURE

This disclosure generally relates to aerobic metal-catalyzed oxidation of lignin and related compounds, such as iron and manganese aerobic catalysis of lignin.

BACKGROUND

The U.S. Renewable Fuels Standard (RFS) mandates the production of 16 billion gallons of lignocellulosic biofuels (primarily EtOH) by 2022. Subsumed with this mandate is the inevitable availability of an enormous amount of lignin as a co-product of biofuel manufacture. Assuming that a commercial biorefinery produces 80 gallons biofuel/ton biomass and that the biomass averages 20% by weight lignin; operation at the legislated levels of the RFS will afford 40 million tons of lignin on an annual basis. This remarkable level of renewable carbon production and availability is an attractive target for downstream chemical processing and conversion to higher value materials. However, the heterogeneous structure of lignin has frustrated efforts to selectively convert this abundant biopolymer into low molecular weight aromatics. Moreover, the structure of lignin is variable. The distribution of substructural units within isolated lignin is a function of both the lignin source and the methodology employed in its isolation. Lignin possesses a network of alkyl chains linking the aromatic network together.

A few reports on lignin oxidations are available where either enzymes or complex catalytic systems such as perovskite-type oxides are used, with a variety of benzylic oxidation procedures are available where stoichiometric or catalytic amounts of reagents. However, in most of these reactions, hazardous, expensive and toxic heavy metals may be required. Further, most of these procedures are specific to a very small number of substrates. There exists therefore, a simple catalytic oxidation that can oxidize a wide range of lignin compounds to corresponding carboxylic acids.

SUMMARY

Disclosed are methods for the oxidation of lignin and related compounds into smaller molecular weight compounds. This method includes contacting lignin or related compounds with manganese and iron catalysts in the presence of oxygen at a reaction temperature for a time sufficient for oxidation of lignin, which can in some embodiments, produce a carboxylic acid. In some embodiments of the disclosed method the lignin or related compound is contacted with the metal catalyst in the presence of a solvent, such as a solvent used for lignin solvation. In a specific embodiment, the solvent is acetic acid. In some embodiments, the lignin is contacted with a manganese salt such as a $Mn^{2+}$ salt, for example $Mn(NO_3)_2$ or a hydrate thereof. In some embodiments, the lignin is contacted with an iron salt such as a $Fe^{3+}$ salt, for example $Fe(NO_3)_3$ or a hydrate thereof. In some embodiments of the method, the molecular oxygen is present in a partial pressure above the partial pressure of oxygen at atmospheric conditions. In some embodiments, the lignin is further contacted with a cobalt compound, which under at least some conditions, has been shown to increase yield of the lignin oxidation products. In some embodiments, the oxidation products of the lignin are recovered.

The foregoing and other features and advantages of the disclosure will become more apparent from the following detailed description, which proceeds with reference to the accompanying figures.

BRIEF DESCRIPTION OF THE DRAWINGS

FIG. 4 is Table 2.

FIG. 5 is Table 3.

FIG. 6 is Table 4.

DETAILED DESCRIPTION

I. Summary of Terms

Figure 1:
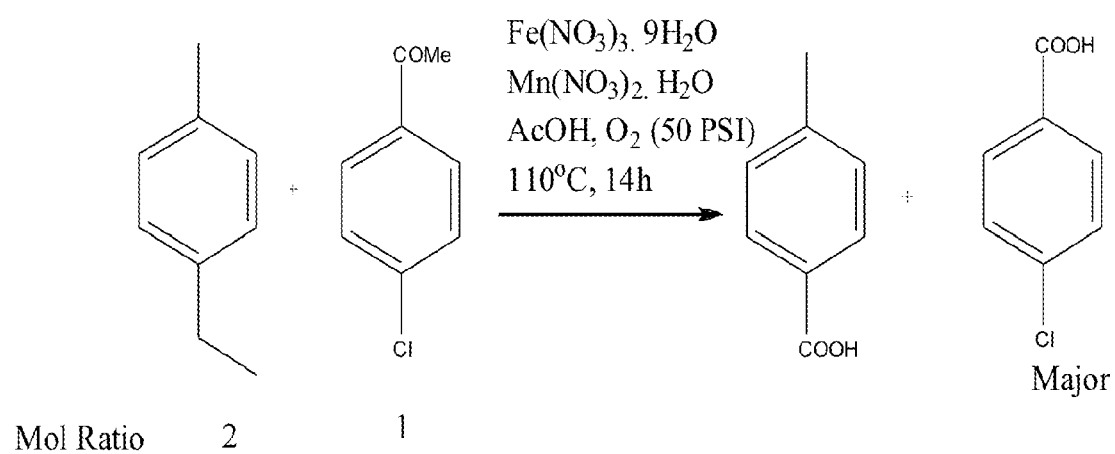
FIG. 1 is a schematic showing the reaction of iron and manganese catalyzed oxidations under controlled conditions.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Unless otherwise noted, technical terms are used according to conventional usage. Definitions of common terms in chemistry may be found in Richard J. Lewis, Sr. (ed.), *Hawley's Condensed Chemical Dictionary*, published by John Wiley & Sons, Inc., 1997 (ISBN 0-471-29205-2).

To facilitate review of the various embodiments of the disclosure, the following explanations of specific terms are provided:

"Organosolv" is a process that uses an organic solvent to solubilize lignin and hemicellulose. It has been considered in the context of both pulp and paper manufacture and biorefining for subsequent conversion of cellulose to fuel ethanol.

Organosolv involves contacting a lignocellulosic feedstock such as chipped wood with an aqueous organic solvent at temperatures ranging from about 140 to about 220° C. This causes lignin to break down by hydrolytic cleavage of alpha and beta aryl-ether links into fragments that are soluble in the solvent system. Solvents used include acetone, methanol, ethanol, butanol, methyl isobutyl ketone, ethylene glycol, formic acid, and acetic acid. The concentration of solvent in water typically ranges from about 40% to about 80%.

II. Detailed Description of Several Embodiments

A. Introduction

Benzylic oxidation is synthetic transformation of aryl carbonyls, alkyl aromatics and benzylic alcohols to corresponding carboxylic acids. There are a number of techniques that could be considered to oxidize monomeric lignin models. For example, transformation of simple alkyl aromatics to the corresponding acid has been carried out by heating the substrate in air in presence of stoichiometric ZnO. Highly selective oxidation of ethyl benzene to benzoic acid occurs in supercritical water in the presence of $MnBr_2$. Substrates partially oxidized at the benzylic position are also converted to the corresponding carboxylic acid. In one such case, aryl ketones were converted to benzoic acids in presence of a Co—Mn (2 mol %) catalyst. A more general conversion of either alkyl aromatics and alkyl aryl ketones to corresponding benzoic acids occur using t-BuOOH in the presence of $WO_3$. However, in this case, a large amount (20 mole %) of catalyst was used and the reaction required 40% NaOH as an additive. In fact, more generally, many of these oxidations require harsh conditions, expensive and toxic heavy metals, or the use of halide additives.

Thus for the oxidation of lignin, the inventors sought to develop a simple catalytic oxidation technique that employs environmentally benign oxidants ($O_2$) and that can oxidize the benzylic position of each ring regardless of its oxidation level or substitution. The benzylic position of each aromatic ring was selected for targeting because it is a point of unique reactivity for oxidative cleavage of side chains and separation of aromatic rings from the lignin network. Isolated biorefinery lignin contains a wide range of functionality at the benzylic position, including carbonyl and hydroxyl groups, alkyl ethers, and lower amounts of unfunctionalized alkyl groups.

To this end, disclosed herein is the use of a new catalytic system able to carry out benzylic oxidation of a wide range of substituted lignin models. Disclosed herein, the inventors have developed a method of benzylic oxidation as a means to catalytically oxidize those alkyl chains linking the aromatic network while retaining lignin's aromatic rings. This catalytic benzylic oxidation has been developed that can oxidize lignin and related compounds to corresponding carboxylic acids. In general terms, oxidation is carried out in a mixture containing iron (III) and manganese (II) salts as the catalysts in a weak acid and molecular oxygen as the oxidant. In some embodiments, addition of catalytic amounts of cobalt (II) salt to the iron-manganese system can be used to improve yield.

B. Metal Catalyzed Benzylic Oxidation of Lignin

Disclosed are methods for the catalytic oxidation of lignin and related compounds, for example, the oxidative depolymerization of lignin and related compounds. In some embodiments, this oxidation is catalytic benzylic oxidation of lignin and related compounds. The disclosed methods including contacting lignin, and/or related compounds, with manganese and iron in the presence of molecular oxygen, in a solvent capable of solvating lignin and/or related compounds and heating the resultant composition (and/or reaction mixture) at a reaction temperature for time sufficient for oxidation of lignin. In some embodiments, the lignin or related compounds are contacted with manganese, such as in the form of a compound containing a $Mn^{2+}$ ion (Mn(II)), for example a salt that includes $Mn^{2+}$ and counter ions. In some embodiments, is $Mn(OAc)_2$, $MnCl_2$, $MnBr_2$, $MnSO_4$, $Mn(NO_3)_2$ and the like, or a hydrate thereof. In some embodiments, the manganese compound is $Mn(NO_3)_2$ or a hydrate thereof. In some embodiments, the lignin or related compounds are contacted with iron, such as in the form of a compound containing a $Fe^{3+}$ ion (Fe(III)), for example a salt that includes $Fe^{3+}$ and counter ions. In some embodiments, the iron compound is $FeSO_4$, $FeCl_3$, $FeCl_3$, $Fe(NO_3)_3$, and the like or a hydrate thereof. In some embodiments, the iron compound is $Fe(NO_3)_3$ or a hydrate thereof. In some embodiments, the oxidative product of lignin or a related compound is a carboxylic acid. In some embodiments, the lignin or related compound is contacted in a solvent of use in solvating lignin or related compounds. Solvents of use in solvating lignin are known in the art. In some embodiments, the solvent includes acetone, methanol, ethanol, butanol, ethylene glycol, formic acid, acetonitrile, dimethylformamide, methyl isobutyl ketone, acetic acid or any combination thereof. In a specific embodiment, the solvent includes acetic acid.

The disclosed methods are carried out in aerobic conditions. In some embodiments, molecular oxygen is present at a partial pressure greater than about 15 pounds per square inch (psi) at 25° C., such as greater than about 20 psi, about 30 psi, about 40 psi, about 50 psi, about 60 psi, about 70 psi, about 80 psi, about 90 psi, about 100 psi, about 110 psi, 120 psi, about 130 psi, about 140 psi, about 150 psi, about 160 psi, about 170 psi, about 180 psi, about 190 psi, about 200 or even greater. In some embodiments, the methods are carried out between about 15 psi and about 100 psi, such as about 15 psi to about 75 psi, about 20 psi to about 60 psi. In some embodiments, the methods are carried out in a closed chamber, such as a reaction vessel. In some examples, the methods are carried out at a partial pressure of oxygen of less than about 4000 psi, such as less than about 3000 psi, less than about 2000 psi, less than about 1000 psi, less than about 500, psi, less than about 250 psi, or even less than about 100 psi at 25° C. At 25° C. is meant herein to refer to the pressure as taken if the reaction were at 25° C. Thus, when the reaction mixture is heated, it is possible that the pressure would be increased over this value according to well established gas laws known in the art.

In some embodiments, the mixture is heated above room temperature to facilitate oxidation of the lignin or related compounds, for example at a reaction temperature sufficient for oxidation of lignin. In some examples, the reaction temperature is the range of about 50° C. to about 200° C., such as about 55° C., about 60° C., about 65° C., about 70° C., about 75° C., about 80° C., about 85° C., about 90° C., about 95° C., about 100° C., about 105° C., about 120° C., about 125° C., about 130° C., about 135° C., about 140° C., about 145° C., about 150° C., about 155° C., about 160° C., about 165° C., about 170° C., about 175° C., about 180° C., about 185° C., about 190° C. about 195° C., about 200° C., or even greater, such from about 105° C. to about 115° C., about 75° C. to about 130° C., about 55° C. to about 170° C., about 95° C. to about 125° C., about 85° C. to about 145° C. and the like.

In some embodiments, the reaction is heated at the reaction temperature for a time sufficient for oxidation of lignin. In embodiments, the reaction time is from about of 4 hours to about 30 hours although shorter and longer times are envisioned. In some embodiments, the reaction time is about 4, hours about 5 hours, about 6, hours, about 7 hours, about 8 hours, about 9 hours, about 10 hours, about 11 hours, about 12 hours, about 13 hours, about 14, hours about 15 hours, about 16, hours, about 17 hours, about 18 hours, about 19 hours, about 20 hours, about 21 hours, about 22 hours, about 23 hours, about 24, hours about 25 hours, about 26, hours, about 27 hours, about 28 hours, about 29 hours, about 30 hours, about 31 hours, about 32 hours, about 33 hours, about 34, hours about 35 hours, about 36, hours, about 37 hours, about 38 hours, about 39 hours, or about 40 hours, such as about 4 hours to about 20 hours, about 8 hours to about 20 hours, about 10 hours to about 35 hours, about 15 hours to about 20 hours and the like.

In some embodiments, there are about 0.01 mmols to about 1 mmol of manganese to about 10 mmols of lignin monomer, such as about 0.01 mmols, about 0.05, about 0.1 mmol, about 0.2 mmol, about 0.3 mmol, about 0.4 mmol, about 5 mmol or about 1.0 mmol manganese to about 10 mmols of lignin monomer, such as about 0.2 mmols to about 0.4 mmols of manganese to about 10 mmols of lignin monomer.

In some embodiments, there are about 0.01 mmols to about 1 mmol of iron to about 10 mmols of lignin monomer, such as about 0.01 mmols, about 0.05, about 0.1 mmol, about 0.2 mmol, about 0.3 mmol, about 0.4 mmol, about 5 mmol or about 1.0 mmol manganese to about 10 mmols of lignin monomer, such as about 0.2 mmols to about 0.4 mmols of iron to about 10 mmols of lignin monomer.

In some embodiments the lignin is contacted with a cobalt compound, such as a cobalt compound that includes a $Co^{2+}$ ion, for example $Co(OAc)_2$, $Co(NO_3)_2$ $CoCl_2$, $CoBr_2$, $CoSO_4$ and the like, or a hydrate thereof. In specific embodiments, the cobalt compound is $Co(NO_3)_2$ or a hydrate thereof. In some embodiments, there are about 0.01 mmols to about 1 mmol of cobalt to about 10 mmols of lignin monomer, such as about 0.01 mmols, about 0.05, about 0.1 mmol, about 0.2 mmol, about 0.3 mmol, about 0.4 mmol, about 5 mmol or about 1.0 mmol manganese to about 10 mmols of lignin monomer, such as about 0.2 mmols to about 0.4 mmols of cobalt to about 10 mmols of lignin monomer. In some embodiments, the end groups of lignin include aryl ketones, aryl alkyls, aryl alcohols, acetophenones and benzylic alcohols.

In some embodiments, the disclosed methods further include recovering the oxidation product of the lignin, which can be a carboxylic acid of the lignin. In some embodiments, recovering the oxidation product of the lignin includes one or more of: removing at least a portion of solvent; treating the oxidizing composition with neutralizing agent; separating the aqueous fraction from the organic fraction; and acidifying the aqueous fraction to precipitate the oxidation product. In some example the solvent is acetic acid and the solvent is distilled, for example after cooling the mixture to room temperature. In some examples, the mixture is neutralized with $NaHCO_3$, such as saturated $NaHCO_3$. In some examples, $CH_2Cl_2$ or other organic solvent is added to the reaction mixture and the layers separated. In some examples, the organic extract is washed with aqueous $NaHCO_3$, such as a saturated $NaHCO_3$ solution. In some examples combined aqueous extract is acidified, for example, with $H_2SO_4$ to generate a precipitate. In some examples, the precipitate is recrystallized for purification, for example, from hexane and acetone.

In some embodiments, lignin or related compounds to be oxidized are substantially free of uncapped benzylic phenolic hydroxyl groups. This does not mean that the lignin composition as a whole be free of uncapped phenolic hydroxyl groups. The lignin or related compounds may include compounds which have uncapped phenolic hydroxyl groups. In some embodiments, the lignin is in a lignocellulosic biomass. In some examples the lignin composition of the lignocellulosic biomass is substantially free of uncapped phenolic hydroxyl groups.

In some embodiments, the molecular weight of a monoligninol (such as lignin monomer) is in the range of about 180 to 200. In some examples, the acetic acid is in the range of about is 15-20 ml acetic acid per 10 mmol of a lignin compound, such as about 10-30 ml per 1 to 30 mmol of a lignin compound.

EXAMPLES

Example 1

An initial screening of several conventional benzylic oxidation catalysts revealed that most procedures were functional group specific. For example, oxidation of aryl alkyl ketones such as 1-(4-chlorophenyl)ethanone using a mixture of 2 mol % of $Co(NO_3)_2$ and 2 mol % of $Mn(NO_3)_2$ in acetic acid at 100° C. using oxygen afforded the corresponding benzoic acids in 83% yield. However, the same catalyst was unable to oxidize aryl alkyls. In contrast, oxidation of 1-methoxy-4-propylbenzene with 2 mol % $Fe(NO_3)_2 \cdot 9H_2O$ in acetonitrile at 82° C. using tertiary butyl hydroperoxide (TBHP) as the oxidant gave the corresponding acid in 33% yield. It was found that replacing $Co(NO_3)_2$ in the Co—Mn mixed catalyst system with 3 mol % $Fe(NO_3)_3$ and carrying out the oxidation in acetic acid and 60 PSI of oxygen at 110° C. for 14 h afforded a catalytic technique able to oxidize either aryl alkyl ketones or aryl alkyls possessing functionalities similar to lignin. Moderate to good yields were obtained in most cases (Table 1).

TABLE 1

Oxidation of lignin monomers[1]

| Entry | Substrate | Mu + Fe Product (s) | Mu + Fe + Co Product (s) |
|---|---|---|---|
| 1 | 4-MeOPhCOMe | 4-MeO—PhCOOH (72%) | 4-MeOPhCOOH (80%) |
| 2 | 3,5-(MeO)$_2$ PhCOMe | 3,5-(MeO)$_2$PhCOOH (54%) | 3,5-(MeO)$_2$PhCOOH (55%) |
| 3 | 4-EtPhCOMe | 4-EtPhCOOH (58%) | |
| 4 | 3,4-(MeO)$_2$PhCOMe | 3,4-(MeO)$_2$PhCOOH (50%) | 3,4-(MeO)$_2$PhCOOH (51%) |
| 5 | 4-Cl—PhCOMe | 4-Cl—PhCOOH (44%) | |
| 6 | 3-MePhCOMe | 3-MePhCOOH (41%) | |
| 7 | 3,4,5-(MeO)$_3$PhCOMe | 3,4,5-(MeO)$_3$PhCOOH (41%) | 3,4,5-(MeO)$_3$PhCOOH (53%) |
| 8 | PhCOCH$_2$Me | PhCOOH (32%) | PhCOOH (41%) |
| 9 | PhCH$_2$CHMe$_2$ | PhCOOH (29%) PhCHO (trace) | PhCOOH (27%) |
| 10 | 1,2-(MeO)$_2$Ph-4-CH$_2$CH=CH$_2$ | 3,4-(MeO)$_2$PhCOOH (26%) | 3,4-(MeO)$_2$PhCOOH (29%) |

TABLE 1-continued

Oxidation of lignin monomers[1]

| Entry | Substrate | Mu + Fe Product (s) | Mu + Fe + Co Product (s) |
|---|---|---|---|
| 11 | 4-MePhCHMe$_2$ | 4-MePhCOOH (20%)<br>4-MePhCHO(trace) | |
| 12 | 4-CH$_2$CH=CH$_2$, MeOPh | 4-MeOPhCOOH (19%),<br>4-MeOPhCHO (trace) | |
| 13 | PhCH(OH)Me | PhCOOH(35%)<br>PhCHO(14%) | PhCOOH(33%)<br>PhCHO(16%) |
| 14 | PhCH$_2$OH | PhCOOH (41%)<br>PhCHO(39%) | |

[1]Reaction conditions: Mn(NO$_3$)$_2$•H$_2$O (2 mol %), Fe(NO$_3$)$_3$•9H$_2$O (3 mol %), Co(NO$_3$)$_2$•5H$_2$O (2 mol %), Solvent: acetic acid (20 mL), Oxidant: oxygen (60 PSI), 110° C., 14 h.

Control reactions showed that when only iron was used as the catalyst with alkyl aryl ketones, no acid was isolated indicating the presence of manganese was necessary. Manganese catalyzed oxidation of an aryl alkyl also did not give any isolable yield of acids in absence of iron and thus, the presence of iron was necessary.

The catalyst was also tested for the oxidation of 1-(4-methoxyphenyl)ethanone, which gave 72% yield of 4-methoxy benzoic acid upon oxidation (Table 1, Entry 1). Similarly, 1-(3,5-dimethoxyphenyl)ethanone gave corresponding carboxylic acid with a 54% yield (Table 1, Entry 2). When 1-(m-tolyl)ethanone was used, 3-methylbenzoic acid was obtained in 41% yield (Table 1, Entry 6). In this reaction the methyl group remained unaffected. The catalyst system gave low to moderate yields with most alkyl aromatics. For example, 4-allyl-1,2-dimethoxybenzene gave 26% yield (Table 1, Entries 10). 4-allyl-methoxybenzene gave 19% yield upon oxidation (Table 1, Entry 13). In few cases of aryl alkyl oxidations, trace amount of corresponding aryl aldehyde were also formed (Table 1, Entries 9, 11). Unreacted starting substrate was recovered in some cases. When this catalyst was used for the oxidation of phenylethanol, 35% benzoic acid and 14% of benzaldehyde were obtained (Table 1, entry 14). Similar results were obtained with phenylmethanol, where 41% of benzoic acid and 39% benzaldehyde were obtained (Table 1, entry 15).

When the catalyst was used on 4-ethyl acetophenone, only 4-ethylbenzoic acid could be isolated (Table 1, entry 3). When a 5:1 molar mixture of 1-ethyl-4-methylbenzene and 4-chloroacetophenone was used as the substrate, NMR analysis showed presence of both 4-chlorobenzoic acid and 4-methylbenzoic acid. However, 4-chlorobenzoic acid was the major product and most of the 1-ethyl-4-methylbenzene was unreacted and recovered during workup. Thus, this catalytic system preferentially oxidizes carbonyl groups (FIG. 1).

Previous work has shown that in the Mn(II)-Co(II) catalytic system, Co(II) acted as a radical initiator. Co(II) facilitated the reaction and generated higher yields of acids. In case of alkyl aryl ketone oxidation, when Co(II) is added, it reacts with oxygen and forms a peroxyl radical (Co(III)OO$^-$). The peroxyl radical abstracts the hydrogen next to a carbonyl group and forms a α-keto carbonyl radical. This effect was also observed in the methods and reactions disclosed herein. When 2 mol % of a cobalt salt was added to the existing iron manganese system, it improved yields in several cases (Table 1). For example, using a cobalt salt with the iron-manganese system increases the yield of the carboxylic acid from 73 to 80% in case of 1-(4-methoxyphenyl)ethanone (Table 1, entry 1). Yields were also increased in oxidations of some aryl alkyls (Table 1).

The catalytic system gave a complex mixture of products with aromatics having a phenolic hydroxyl group. Oxidation 4-allyl-2-methoxyphenol with this catalytic system generated a highly viscous product mixture from which only a small amount of 4-acetoxy-3-methoxybenzoic acid was isolated. In this case, a small amount of reactant was acetylated. The open hydroxyl group in 4-allyl-2-methoxyphenol reacted with different species in the reaction medium and results in a complex product mixture.

Mechanistic Consideration

Figure 2:
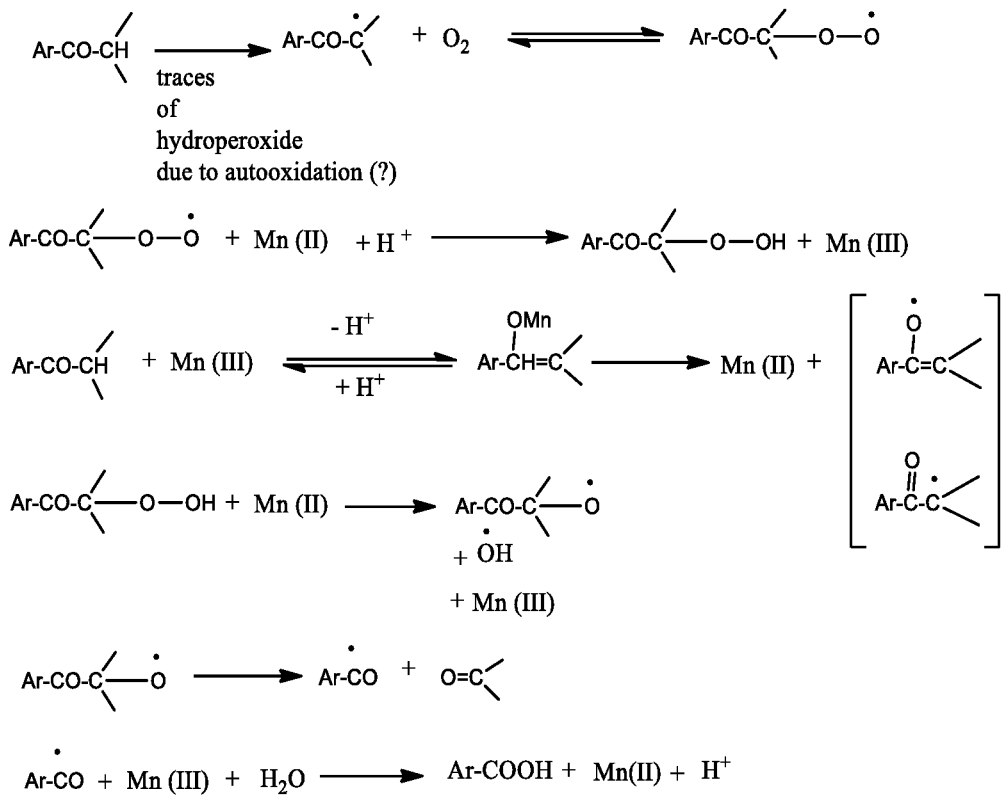
FIG. 2 is a schematic showing the possible mechanism for the manganese (II) catalyzed oxidation.
Figure 3:
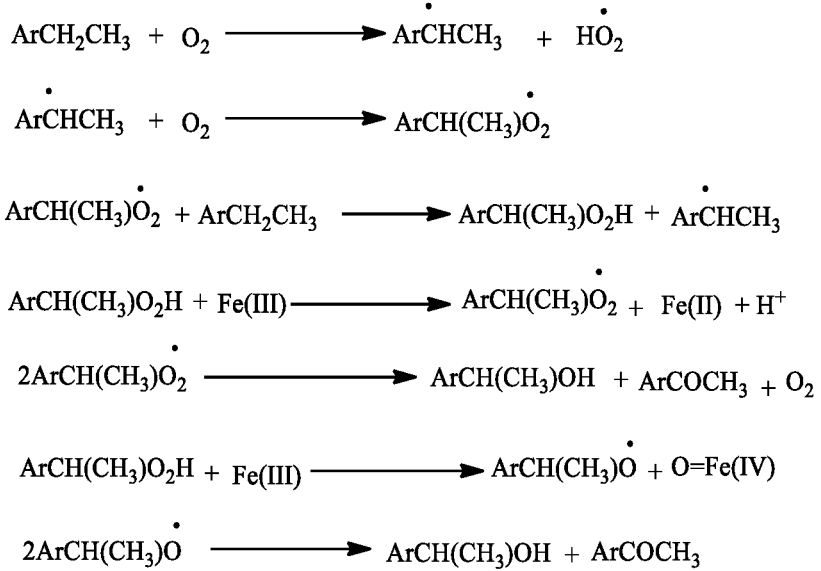
FIG. 3 is a schematic showing the possible mechanism for the iron (III) catalyzed oxidation.

While not being bound by theory, the probable mechanism of this catalytic system combines previously reported mechanistic studies of manganese catalyzed oxidation of aryl alkyl carbonyls and iron catalyzed oxidation of alkyl aromatics. As per the previous reports, the oxidation of aryl alkyl carbonyls initiates by the formation of trace amount hydroperoxides by the reaction of oxygen and substrate (aryl alkyl carbonyl). In presence of hydroperoxides a α-keto radical (FIG. 2) is formed. It then reacts with oxygen and forms a peroxo radical. The reaction of the peroxo radical and Mn (II) in presence of an acid generates peroxide and Mn (III). Mn (III) then reacts with aryl alkyl carbonyls and regenerates α-keto radical and Mn(II). Next, Mn(II) reacts with peroxide and generates alkoxy radical which in the subsequent step forms a carbonyl radical. In presence of Mn(III), the carbonyl radical reacts with water and forms a carboxylic acid. The oxidation of alkyl aromatics probably occurs by a radical chain mechanism (FIG. 3), where iron is the charge carrier. The reaction is initiated by the formation of a radical by the reaction of an alkyl aromatic with oxygen. The alkyl aromatic radical then reacts with oxygen and forms a peroxo radical which then reacts with another molecule of aryl alkyl and generates alkyl aryl radical and peroxide. The peroxide then reacts with Fe(III) and forms an alkoxy radical which subsequently converts to an aryl carbonyl and a benzylic alcohol. In presence of oxygen, both of these products undergo further oxidations.

Oxidation of Isolated Organosolv Lignin

Oxidation of an isolated lignin sample was carried out using the disclosed catalytic system containing iron, manganese and cobalt salts. The lignin sample was prepared by organosolv fractionation of switchgrass. Typically, a mixture of Mn(NO$_3$)$_2$.*H$_2$O (0.2 mmol), Fe(NO$_3$)$_3$.*9H$_2$O (0.3 mmol) and Co(NO$_3$)$_2$*6H$_2$O (0.2 mmol) was added to the mixture of acetic acid (20 mL) and lignin (1 g) in a high pressure glass vessel. The whole mixture was stirred for 10 minutes using a magnetic stirrer. The glass vessel was sealed and placed in an oil bath. Molecular oxygen was added to the closed system until the pressure reached 60 PSI, and the system was heated to 110° C. The reaction was stirred for 14 h.

The oxidation process afforded a soluble fraction as well as unreacted residual lignin. Comparing the GC-MS chromatograms of the methylene chloride extracts of the starting lignin and oxidized lignin showed significant changes in the product profile. This result was consistent with the results from the model studies. Comparison of the infrared spectra of same extracts also showed presence of carbonyl stretches in the oxidized lignin extract.

Further, HMQC NMR analysis of starting lignin, oxidized lignin and lignin derived from a blank reaction (without metal salts, in presence of acetic acid and oxygen) were done to study the effect of the metal catalyzed oxidation (Table 2, 3, and 4). The HMQC spectra of the starting lignin and the lignin resulting from the blank reaction did not show much difference except in the sidechain and alkyl regions. This may be due to the use of acetic acid as the solvent, which could hydrolyze the carbohydrate linkages. The HMQC spectrum of the oxidized lignin was significantly different than the other two. The HMQC spectrum of the oxidized lignin showed new peaks in both carbonyl and aromatic regions. The new peak at the carbonyl region confirmed the generation of an aldehydic proton by the oxidation. Disappearance and shifting of some of guaiacyl and syringyl peaks occurs probably due to the acetylation during the oxidation reaction. Comparison with lignin database shows potential formations of various esters, acids and quinones due to the oxidation.

Experimental

Switchgrass lignin was obtained using a published process. (Bozell, et al. *J. Agric. Food Chem.*, 2011, 59, 9232-9242, which is hereby incorporated by reference in its entirety). All other chemicals and reagents were purchased from Sigma Aldrich USA and used as received.

NMR spectra ($^1$H and $^{13}$C) were recorded on a Varian 400-MR spectrometer equipped with a broad band probe operating at 399.78 MHz for $^1$H and 100.54 MHz for $^{13}$C. Free induction decays (FIDs) from oxidation of monomeric lignin models were processed using the ACD LAB 1D NMR processor. FIDs of lignin and lignin oxidation products were processed using Mnova, version 6.2.1. Spectra were measured on approximately 0.08 g of monomeric lignin model oxidation product dissolved in CDCl$_3$ and referenced to either the residual CHCl$_3$ or TMS peak. In some cases, DMSO-d$_6$ was used as the solvent and solvent residual peak at 2.5 ppm was used as reference. In a few spectra, solvent peaks from water or methylene chloride are present. These peaks are identified by comparing with a previous report (Gottlieb et al., *J. Org. Chem.* 1997, 62, 7512-7515). HMQC analysis of lignin was carried out using 0.1 g of lignin sample dissolved in 750 µL of DMSO-d$_6$ and filtered into an NMR tube through a small piece of KIMWIPE™ in a Pasteur pipet. The HMQC NMR protocol had 512 increments and 32 scans/increment in the F2 direction, giving a spectrum size of 1024×1024. A 90° pulse with a pulse delay of 1.5 s, an acquisition time of 0.13 s, and a single bond C—H coupling constant of 147 Hz were employed. Runs were carried out at RT without spinning and typically required about 16 h.

FT-IR spectra of samples were recorded using PERKIN-ELMER® FT-IR instrument.

Qualitative GC/MS was carried out with a Shimadzu 17A gas chromatograph (17A; Shimadzu, Columbia, Md.) coupled to a quadrupole mass selective detector (QP5050A; Shimadzu). Separation was performed on a column 30 m×0.25 mm i.d.×0.25 mm thick (Restek SHR5XLB; Shimadzu). Helium was the carrier gas (flow rate of 5 mL min$^{-1}$). A splitless injection (injection temperature 250° C.) was used. A temperature gradient of 6° C. min$^{-1}$ from 60° C. (3-min hold) to 300° C. was applied. GC-MS analysis of lignin and lignin oxidation products was carried out using 0.1 g of lignin sample dissolved in 20 mL of methylene chloride and filtered into a flask. This solution (1 mL) was placed into an auto sampler vial. Then 2.0 µL of this sample was injected to acquire each chromatogram. No quantitative analysis was done in any case.

Standard Procedure for the Oxidation of Lignin Monomers:

A mixture of Mn(NO$_3$)$_2$*H$_2$O (0.06 g, 0.2 mmol) and Fe(NO$_3$)$_3$*9H$_2$O (0.08 g, 0.3 mmol) was added to an acetic acid (20 mL) solution of a lignin monomer (10 mmol) in a Fisher-Porter bottle. In reactions employing a Co co-catalyst, Co(NO$_3$)$_2$*6H$_2$O (0.05 g, 0.2 mmol) was also added to the mixture. The mixture was magnetically stirred for 10 minutes at room temperature. The bottle was sealed with a pressure head and placed in an oil bath. The system was pressurized to 60 psi with molecular oxygen and heated to 110° C. in an oil bath for 14 h. The reaction mixture was cooled to room temperature and the acetic acid was distilled from the mixture. Saturated NaHCO$_3$ (20 mL) was added to the residue and mixed thoroughly. CH$_2$Cl$_2$ (20 mL) was added to the mixture and the layers separated. The organic extract was washed with saturated NaHCO$_3$ solution (2×10 mL). The combined aqueous extract was acidified with 1N H$_2$SO$_4$ to generate a precipitate which was isolated via vacuum filtration. The precipitate was recrystallized from hexane and acetone.

In cases where precipitates did not form, the acidic extract was washed with CH$_2$Cl$_2$ (2×15 mL). The solvent was removed on the rotary evaporator and the residue was purified using column chromatography and 1:1 hexane/ethyl acetate elutant. The isolated product was identified by comparing its $^1$H, $^{13}$C NMR and IR spectra with references available in Sigma Aldrich USA and SDBS spectral databases.

Oxidation of 1-(4-methoxyphenyl)ethanone 1-(4-methoxyphenyl)ethanone (1.50 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. In reactions employing a Co co-catalyst, Co(NO$_3$)$_2$*6H$_2$O (0.05 g, 0.2 mmol) was also added to the mixture. Standard workup gave 1.10 g (72%) of 4-methoxybenzoic acid. Oxidation in the presence of added Co(NO$_3$)$_2$*6H$_2$O (0.2 mmol) gave 1.22 g (80%) of 4-methoxybenzoic acid. The product identity was confirmed by comparing the NMR and IR spectra of the product with the reference.

Oxidation of 1-(3,5-dimethoxyphenyl)ethanone 1-(3,5-dimethoxyphenyl)ethanone (1.80 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. In reactions employing a Co co-catalyst, Co(NO$_3$)$_2$*6H$_2$O (0.05 g, 0.2 mmol) was also added to the mixture. Standard workup gave 0.98 g (54%) of 3,5-dimethoxybenzoic acid. Oxidation in the presence of added Co(NO$_3$)$_2$*6H$_2$O (0.2 mmol) gave 1.01 g (55%) of 3,5-dimethoxybenzoic acid. The product identity was confirmed by comparing the NMR and IR spectra of the product with the reference.

Oxidation of 1-(4-ethylphenyl)ethanone 1-(4-ethylphenyl)ethanone (1.48 g, 10 mmol) was mixed with Mn(NO$_3$)$_2$*H$_2$O (0.06 g, 0.2 mmol) and Fe(NO$_3$)$_3$*9H$_2$O (0.08, 0.3 mmol) according to the general procedure. Standard workup gave 0.86 g (58%) of 4-ethylbenzoic acid. The identity of product was confirmed by comparing the NMR and IR spectra of the product with the reference.

Oxidation of 1-(3,4-dimethoxyphenyl)ethanone 1-(3,4-dimethoxyphenyl)ethanone (1.80 g, 10 mmol) was mixed with Mn(NO$_3$)$_2$*H$_2$O (0.06 g, 0.2 mmol) and Fe(NO$_3$)$_3$*9H$_2$O (0.08, 0.3 mmol) according to the general procedure. In reactions employing a Co co-catalyst, Co(NO$_3$)$_2$*6H$_2$O (0.2 mmol) was also added to the mixture. Standard workup gave 0.90 g (50%) of 3,4-dimethoxybenzoic acid. Oxidation in the presence of added Co(NO$_3$)$_2$*6H$_2$O (0.2 mmol) gave 0.93 g (51%) of 3,4-dimethoxybenzoic acid. The product identity was confirmed by comparing the NMR and IR spectra of the product with the reference.

Oxidation of 1-(4-chlorophenyl)ethanone 1-(4-chlorophenyl)ethanone (1.54 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. Standard workup gave 0.70 g (44%) of 4-chlorobenzoic acid. The product identity was confirmed by comparing the NMR and IR spectra of the product with the reference.

Oxidation of 1-(m-tolyl)ethanone 1-(m-tolyl)ethanone (1.34 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. Standard workup gave 0.56 g (41%) of 3-methylbenzoic acid. The product identity was confirmed by comparing the NMR and IR spectra of the product with the reference.

Oxidation of 1-(3,4,5-trimethoxyphenyl)ethanone 1-(3,4,5-trimethoxyphenyl)ethanone (2.10 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. In reactions employing a Co co-catalyst, Co(NO$_3$)$_2$*6H$_2$O (0.06 g, 0.2 mmol) was also added to the mixture. Standard workup gave 0.87 g (41%) of 3,4,5-trimethoxybenzoic acid. Oxidation in the presence of added Co(NO$_3$)$_2$*6H$_2$O (0.2 mmol) gave 1.10 g (53%) of 3,4,5-trimethoxybenzoic acid. The product identity was confirmed by comparing the NMR and IR spectra of the product with the reference.

Oxidation of Propiophenone

Propiophenone (1.34 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. In reactions employing a Co co-catalyst, Co(NO$_3$)$_2$*6H$_2$O (0.06 g, 0.2 mmol) was also added to the mixture. Standard workup gave 0.40 g (32%) of benzoic acid. Oxidation in the presence of added Co(NO$_3$)$_2$*6H$_2$O (0.2 mmol) gave 0.53 g (41%) of benzoic acid. The product identity was confirmed by comparing the NMR and IR spectra of the product with the reference.

Oxidation of Isobutylbenzene

Isobutylbenzene (1.34 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. In reactions employing a Co co-catalyst, Co(NO$_3$)$_2$*6H$_2$O (0.05 g, 0.2 mmol) was also added to the mixture. Standard workup gave 0.36 g (29%) of benzoic acid and benzaldehyde (trace amount, no clear NMR was obtained). Oxidation in the presence of added Co(NO$_3$)$_2$*6H$_2$O (0.2 mmol) gave 0.33 g (27%) of benzoic acid. The product (benzoic acid) identity was confirmed by comparing the NMR and IR spectra of the product with the reference.

Oxidation of 4-allyl-1,2-dimethoxybenzene 4-allyl-1,2-dimethoxybenzene (1.78 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. In reactions employing a Co co-catalyst, Co(NO$_3$)$_2$*6H$_2$O (0.05 g, 0.2 mmol) was also added to the mixture. Standard workup gave 0.47 g (26%) of 3,4-dimethoxybenzoic acid. Oxidation in the presence of added Co(NO$_3$)$_2$*6H$_2$O (0.2 mmol) gave 0.52 g (29%) of 3,4-dimethoxybenzoic acid. The product identity was confirmed by comparing the NMR and IR spectra of the product with the reference.

Oxidation of p-Cymene p-cymene (1.34 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. Standard workup gave 0.27 g (20%) of 4-methylbenzoic acid. The product identity was confirmed by comparing the NMR and IR spectra of the product with the reference.

Oxidation of 1-allyl-4-methoxybenzene 1-allyl-4-methoxybenzene (1.48 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. Standard workup gave 0.29 g (19%) of 4-methoxybenzoic acid. The product identity was confirmed by comparing the NMR and IR spectra of the product with the reference.

Oxidation of 1-phenylethanol 1-phenylethanol (1.22 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. In reactions employing a Co co-catalyst, Co(NO$_3$)$_2$*6H$_2$O (0.05 g, 0.2 mmol) was also added to the mixture. Standard workup gave 0.43 g (35%) of benzoic acid and 0.16 g (14%) of benzaldehyde. Oxidation in the presence of added Co(NO$_3$)$_2$*6H$_2$O (0.2 mmol) gave 0.40 g (33%) of benzoic acid and 0.17 g (16%) of benzaldehyde. The product identity was confirmed by comparing the NMR and IR spectra of the product with the reference.

Oxidation of Phenylmethanol

Phenylmethanol (1.08 g, 10 mmol) was mixed with Mn(NO$_3$)$_2$*H$_2$O (0.06 g, 0.2 mmol) and Fe(NO$_3$)$_3$*9H$_2$O (0.08 g, 0.3 mmol) according to the general procedure. Standard workup gave 0.50 g (41%) of benzoic acid and 0.41 g (39%) of benzaldehyde. The product identity was confirmed by comparing the NMR and IR spectra of the product with the reference.

Standard Procedure for the Oxidation of Lignin:

A mixture of $Mn(NO_3)_2*H_2O$ (0.06 g, 0.2 mmol), $Fe(NO_3)_3*9H_2O$ (0.08 g, 0.3 mmol) and $Co(NO_3)_2*6H_2O$ (0.05 g, 0.2 mmol) was added to an acetic acid (20 mL) mixture of 1 g of organosolv lignin in a Fisher-Porter bottle. The mixture was magnetically stirred for 10 minutes at room temperature. The bottle was sealed with a pressure head and placed in an oil bath. The system was pressurized to 60 psi with molecular oxygen and heated to 110° C. in an oil bath for 14 h. The reaction mixture was cooled to room temperature and the acetic acid was distilled from the mixture. A dark brown solid residue was obtained. Methylene chloride extract of this residue was used for GC-MS analysis. For NMR studies, an additional filtration through a silica gel column using 1:1 hexane/ethyl acetate mobile phase was performed to remove all metal salts from the residue. All eluting fractions containing products were combined and concentrated. A DMSO-$d_6$ solution of the concentrate was prepared for the NMR analysis.

For the blank reaction, 1 g of organosolv lignin was added to acetic acid (20 mL) in a Fisher-Porter bottle. The mixture was magnetically stirred for 10 minutes at room temperature. The bottle was sealed with a pressure head and placed in an oil bath. The system was pressurized to 60 psi with molecular oxygen and heated to 110° C. in an oil bath for 14 h. The reaction mixture was cooled to the room temperature and the acetic acid was distilled from the mixture. A dark brown solid residue was obtained. 0.1 g of the residue was dissolved in 800 µL of DMSO-d6 and filtered into an NMR tube through a small piece of KIMWIPE™ for the NMR analysis.

Example 2

In this process, a mixture of $Mn(NO_3)_2.H_2O$ (0.2-0.4 mmol) and $Fe(NO_3)_3*9H_2O$ (0.2-0.5 mmol) was added to the acetic acid (20 mL) solution of a lignin model compound (10 mmol) in a high pressure glass vessel. The mixture was stirred for 10 minutes using a magnetic stirrer. The glass vessel was sealed and placed in an oil bath. Molecular oxygen was added to the closed system until the pressure reached 50 PSI, and the system was heated to 110° C. The reaction was stirred for 14 h. Longer reaction times did not change the outcome of the reaction. After 14 h, the system was cooled to the room temperature and pressure was released. The product mixture was transferred to a round bottom flask. Acetic acid was distilled from the product mixture and the residue was treated with 30 mL of saturated sodium bicarbonate. The solution was stirred for 30 min. 15 mL of methylene chloride was added to the solution and the aqueous and organic fractions were separated in a reparatory funnel. The methylene chloride extract was washed two more times with saturated sodium bicarbonate and all aqueous extracts were combined. The acidification of the combined aqueous extract with 1N $H_2SO_4$ gave the carboxylic acid. In most cases, the carboxylic acid precipitated from the aqueous solution. The acid was collected by vacuum filtration using a Buchner funnel. In a few cases, the product was obtained as a liquid and extracted from the aqueous solution with methylene chloride.

Example 3

A series of oxidations was performed on similar substrates, where the catalyst system was a mixture of $Co(NO_3)_2*6H_2O$ or $Co(OAc)_2$ (0.2-0.4 mmol), $Mn(NO_3)_2*H_2O$ (0.2 mmol-0.4 mmol) and $Fe(NO_3)_3*9H_2O$ (0.2-0.5 mmol). The reaction was then carried out as in Example 2.

The catalytic benzylic oxidation procedure has been tested (with or without cobalt) on a number of substrates containing functional group profiles expected to be present in lignin. The oxidation has been demonstrated with different aryl alkyls, aryl ketones and aryl alcohols. The oxidation gave better results with aryl ketones. Moderate yields were obtained when aryl alkyls or aryl alcohols were used as substrates. Also, presence of cobalt salt generally increased the yield. For example, the oxidation of 4-methoxyacetophenone gave 72% of the 4-methoxycarboxylic acid when a mixture of manganese and iron salts was used. Use of a catalytic system consisting of manganese, iron and cobalt salts gave 76% of the acid. Interestingly, when the catalytic system was used on 4-ethyl acetophenone, 4-ethylbenzoic acid was obtained as the major product. When 4-ethyltoluene was oxidized with this system, 4-methylbenzoic acid was obtained, where less activated methyl group survived. Thus, this catalytic procedure can selectively oxidize ethyl or higher number of carbon containing benzylic side chains in presence of any benzylic methyl group. This selectivity could decrease complexity of any process employing the product (carboxylic acid) as a reactant. When only iron was used as the catalyst with aryl ketones, no acid was obtained in any oxidation indicating the presence of manganese was necessary. Similarly, the presence of an iron salt was necessary to oxidize alkyl aryls. The oxidation was also conducted on a mixture of aryl alkyls and aryl ketones. The carboxylic acid from the aryl ketone was obtained as the major product when the reaction was started with equal amounts of an aryl ketone and an aryl alkyl. Also, the catalytic oxidation technique is not suitable with substrates having any uncapped benzylic hydroxyl group. The reaction was also conducted with other solvents and salts. Acetic acid and nitrate salts were found to be overall most effective in this case.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for oxidizing lignin, comprising:
   contacting lignin with manganese(II), iron(III), and a cobalt compound in the presence of molecular oxygen; and
   heating the composition at a reaction temperature for a reaction time sufficient for oxidation of the lignin, thereby oxidizing lignin.

2. The method of claim 1, wherein oxidizing lignin provides a carboxylic acid.

3. The method of claim 1, wherein the manganese(II) comprises a compound comprising an $Mn^{2+}$ ion.

4. The method of claim 3, wherein the compound comprising an $Mn^{2+}$ ion is $Mn(NO_3)_2$ or a hydrate thereof.

5. The method of claim 1, wherein the iron(III) comprises a compound comprising a $Fe^{3+}$ ion.

6. The method of claim 5, wherein the compound comprising an $Fe^{3+}$ ion is $Fe(NO_3)_3$ or a hydrate thereof.

7. The method of claim 1, wherein the cobalt compound comprises a $Co^{2+}$ ion.

8. The method of claim 7, wherein the compound comprising a $Co^{2+}$ ion is $Co(NO_3)_2$ or a hydrate thereof.

9. The method of claim 1, wherein there are about 0.01 mmols to about 1 mmol of manganese to about 10 mmols of lignin monomer.

10. The method of claim 1, wherein there are about 0.01 mmols to about 1 mmols of iron to about 10 mmols of lignin.

11. The method of claim 1, wherein there are about 0.01 mmols to about 1 mmol of cobalt to about 10 mmols of lignin monomer.

12. The method of claim 1, wherein the molecular oxygen is present in a partial pressure from about 15 psi (1 atmosphere) to about 100 psi at 25° C.

13. The method of claim 1, wherein the reaction temperature is in the range of about 80° C. to about 140° C.

14. The method of claim 1, wherein the reaction time is from about 4 hours to about 30 hours.

15. The method of claim 1, wherein the end groups of the lignin are selected from the group consisting of aryl ketones, aryl alkyls, aryl alcohols, acetophenones, and benzylic alcohols.

16. The method of claim 1, further comprising recovering an oxidation product of the lignin.

17. The method of claim 16, wherein recovering the oxidation product of the lignin comprises recovering a carboxylic acid of the lignin.

18. The method of claim 16, wherein recovering the oxidation product of the lignin comprises one or more of:
   removing at least a portion of the acetic acid;
   treating the oxidizing composition with a neutralizing agent;
   separating the aqueous fraction from the organic fraction; and
   acidifying the aqueous fraction to precipitate the product.

* * * * *